United States Patent
Shen

(10) Patent No.: US 9,466,262 B2
(45) Date of Patent: Oct. 11, 2016

(54) METHOD FOR CONTROLLING DISPLAY SCREEN OF ELECTRONIC APPARATUS AND APPLICATION PROGRAM OF USING THE SAME

(71) Applicant: SHUTTLE INC., Taipei (TW)

(72) Inventor: Ching-Chuan Shen, Taipei (TW)

(73) Assignee: SHUTTLE INC., Taipei (TW)

( * ) Notice: Subject to any disclaimer, the term of this patent is extended or adjusted under 35 U.S.C. 154(b) by 4 days.

(21) Appl. No.: 14/597,606

(22) Filed: Jan. 15, 2015

(65) Prior Publication Data

US 2016/0071488 A1    Mar. 10, 2016

(30) Foreign Application Priority Data

Sep. 5, 2014   (TW) .............................. 103130908 A

(51) Int. Cl.
| | |
|---|---|
| *G09G 5/10* | (2006.01) |
| *G06F 3/01* | (2006.01) |
| *G06F 1/32* | (2006.01) |
| *G06F 1/16* | (2006.01) |

(52) U.S. Cl.
CPC ............... *G09G 5/10* (2013.01); *G06F 1/1684* (2013.01); *G06F 1/1694* (2013.01); *G06F 1/3215* (2013.01); *G06F 1/3231* (2013.01); *G06F 1/3234* (2013.01); *G06F 1/3265* (2013.01); *G06F 3/017* (2013.01); *G09G 2330/021* (2013.01); *G09G 2360/144* (2013.01)

(58) Field of Classification Search
CPC .............. G06F 1/3265; G06F 1/1626; G09G 2330/027

USPC .......................................................... 345/589
See application file for complete search history.

(56) References Cited

U.S. PATENT DOCUMENTS

| | | | |
|---|---|---|---|
| 2010/0328201 A1* | 12/2010 | Marvit | G06F 1/1613 345/156 |
| 2012/0100888 A1* | 4/2012 | Kim | H04M 1/72569 455/556.1 |

(Continued)

FOREIGN PATENT DOCUMENTS

| | | |
|---|---|---|
| TW | 200945316 A | 11/2009 |
| TW | 201322051 A1 | 6/2013 |

OTHER PUBLICATIONS

Office Action dated Sep. 9, 2015 of the corresponding Taiwan patent application.

*Primary Examiner* — Thomas Lett

(74) *Attorney, Agent, or Firm* — Chun-Ming Shih; HDLS IPR Services

(57) ABSTRACT

A method is provided to control a display screen of an electronic apparatus having an accelerometer and a light sensor. The accelerometer acquires a z-axis value and the z-axis value is compared to a first threshold value. The light sensor acquires a brightness value and the brightness value is compared to a second threshold value if the z-axis value is less than the first threshold value. When the z-axis value is less than the first threshold value and the brightness value is less than the second threshold value, the display screen is turned off. In addition, it is to automatically turn on or turn off the display screen by judging detection values of the accelerometer and the light sensor, thereby increasing convenience of operating the electronic apparatus. Further, the detection values are judged to overcome the misjudgement problem of the electronic apparatus.

10 Claims, 7 Drawing Sheets

(56) References Cited

U.S. PATENT DOCUMENTS

| | | | |
|---|---|---|---|
| 2013/0100034 A1* | 4/2013 | Papakipos | G06F 1/1626 345/173 |
| 2014/0025957 A1 | 1/2014 | Chen | |
| 2014/0240292 A1* | 8/2014 | Zeng | G06F 3/01 345/175 |
| 2015/0116364 A1* | 4/2015 | Aurongzeb | G06F 3/0487 345/659 |
| 2015/0378520 A1* | 12/2015 | Chandrasekaran | G06F 3/0482 715/716 |

* cited by examiner

METHOD FOR CONTROLLING DISPLAY SCREEN OF ELECTRONIC APPARATUS AND APPLICATION PROGRAM OF USING THE SAME

BACKGROUND

1. Technical Field

The present disclosure generally relates to an electronic apparatus, and more particularly to a method of controlling a screen of the electronic apparatus.

2. Description of Related Art

With the advancement of technology development, various electronic apparatuses are more and more popular. In particular, portable electronic apparatuses, such as smart mobile devices, tablet personal computers, etc., are the most widely used by many people.

In recent years, the mainstream portable electronic apparatuses are in small size and light weight so that size of the installed battery is smaller and the capacity thereof is reduced. Accordingly, it is important for the electronic apparatus to extend the operating time of the small-size battery.

In the electronic apparatus, one of the most power-consumption devices is the display screen. Generally, the user can turn on or turn off the display screen of the electronic apparatus by manually pressing or switching a power button on the electronic apparatus. However, it is inconvenient and non-fluent for the user to switch the display screen by manually pressing or switching the power button on the electronic apparatus.

In view of the above problem, a built-in accelerometer installed in the electronic apparatus is used to switch the display screen in current technology. More specifically, the accelerometer is used to judge whether the electronic apparatus is moved by the user. When the electronic apparatus is not moved, the display screen is automatically turned off; on the contrary, the display screen is automatically turned on when the electronic apparatus is moved.

However, the malfunction of the shaken electronic apparatus is detected by the accelerometer to turn on the display screen if the electronic apparatus is placed in a pocket or a backpack of the user and the user moves. Accordingly, the malfunction of the electronic apparatus results in inappropriately turning on the display screen and increasing electricity consumption of the electronic apparatus.

SUMMARY

An object of the present invention is to provide a method for controlling a display screen of an electronic apparatus having an accelerometer and a light sensor and an application program of using the same. The detection values of the accelerometer and the light sensor are judged whether the display screen of the electronic apparatus is automatically turned on or turned off.

In order to achieve the above-mentioned object, a method of controlling a display screen of an electronic apparatus having an accelerometer and a light sensor includes steps of: acquiring a z-axis value of the electronic apparatus through the accelerometer and judging whether the z-axis value is less than a first threshold value; acquiring a brightness value of the electronic apparatus through the light sensor and judging whether the brightness value is less than a second threshold value when the z-axis value is less than the first threshold value; and turning off the display screen when the brightness value is less than the second threshold value.

Similarly, the accelerometer acquires the z-axis value and the electronic apparatus judges whether the z-axis value is greater than a first threshold value when the display screen is turned off. The light sensor acquires the brightness value and the electronic apparatus further judges whether the brightness value is greater than the second threshold value. The electronic apparatus turns on the display screen when the z-axis value is greater than the first threshold value and the brightness value is greater than the second threshold value.

Accordingly, it is convenient and fluent for the user to automatically control turning on or turning off the display screen without manually pressing or switching a power button on the electronic apparatus.

Further, the detection values of the accelerometer and the light sensor are judged to turn off the display screen, thus overcoming the misjudgement problem of the electronic apparatus and avoiding electricity consumption because of inappropriately turning on and turning off the display screen.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWINGS

The features of the present invention believed to be novel are set forth with particularity in the appended claims. The present invention itself, however, may be best understood by reference to the following detailed description of the present invention, which describes an exemplary embodiment of the present invention, taken in conjunction with the accompanying drawings, in which:

DETAILED DESCRIPTION

Figure 1:
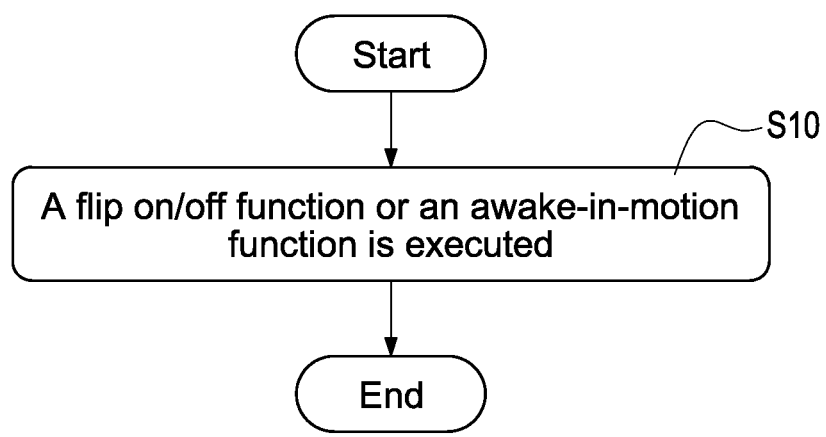
FIG. 1 is a flowchart of a function start according to a first embodiment of the present disclosure.

Reference will now be made to the drawing figures to describe the present invention in detail.

Figure 3A:
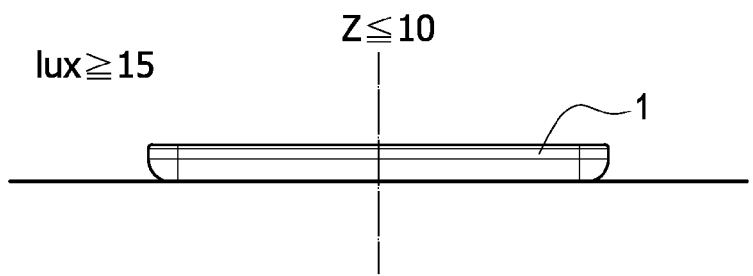
FIG. 3A is a schematic view of a first motion of operating the screen off according to the first embodiment of the present disclosure.

The present disclosure is applied to an electronic apparatus, such as an electronic apparatus 1 as shown in FIG. 3A. More specifically, an accelerometer and a light sensor are provided to acquire detection values of the electronic apparatus, and it is to judge whether the display screen is turned on or turned off according to the detection values. Accordingly, the accelerometer and the light sensor are built in the electronic apparatus 1.

The electronic apparatus 1 in the present disclosure is a smart portable electronic apparatus, such as a smart phone or a tablet personal computer. However, the embodiments are only exemplified but are not intended to limit the scope of the present disclosure. In order to implement the method of controlling the display screen of the electronic apparatus 1, an application program (APP) is required to be installed thereof. The application program records the program codes which can be executed by the electronic apparatus 1. When the application program is automatically executed by the electronic apparatus 1 or manually operated by the user, the steps of controlling the display screen can be implemented.

Reference is made to FIG. 1 which is a flowchart of a function start according to a first embodiment of the present disclosure. When the electronic apparatus 1 first executes the application program or executes a setting function of the application program, a flip on/off function or an awake-in-motion function can be executed according to selections by the user (S10). When the user enables a function, the electronic apparatus 1 pops up a warning window on the display screen to inquire whether the user confirms to enable the function. After the user presses an "OK" button on the warning window, the electronic apparatus 1 can execute program codes of the application program to execute the corresponding function.

Figure 2:
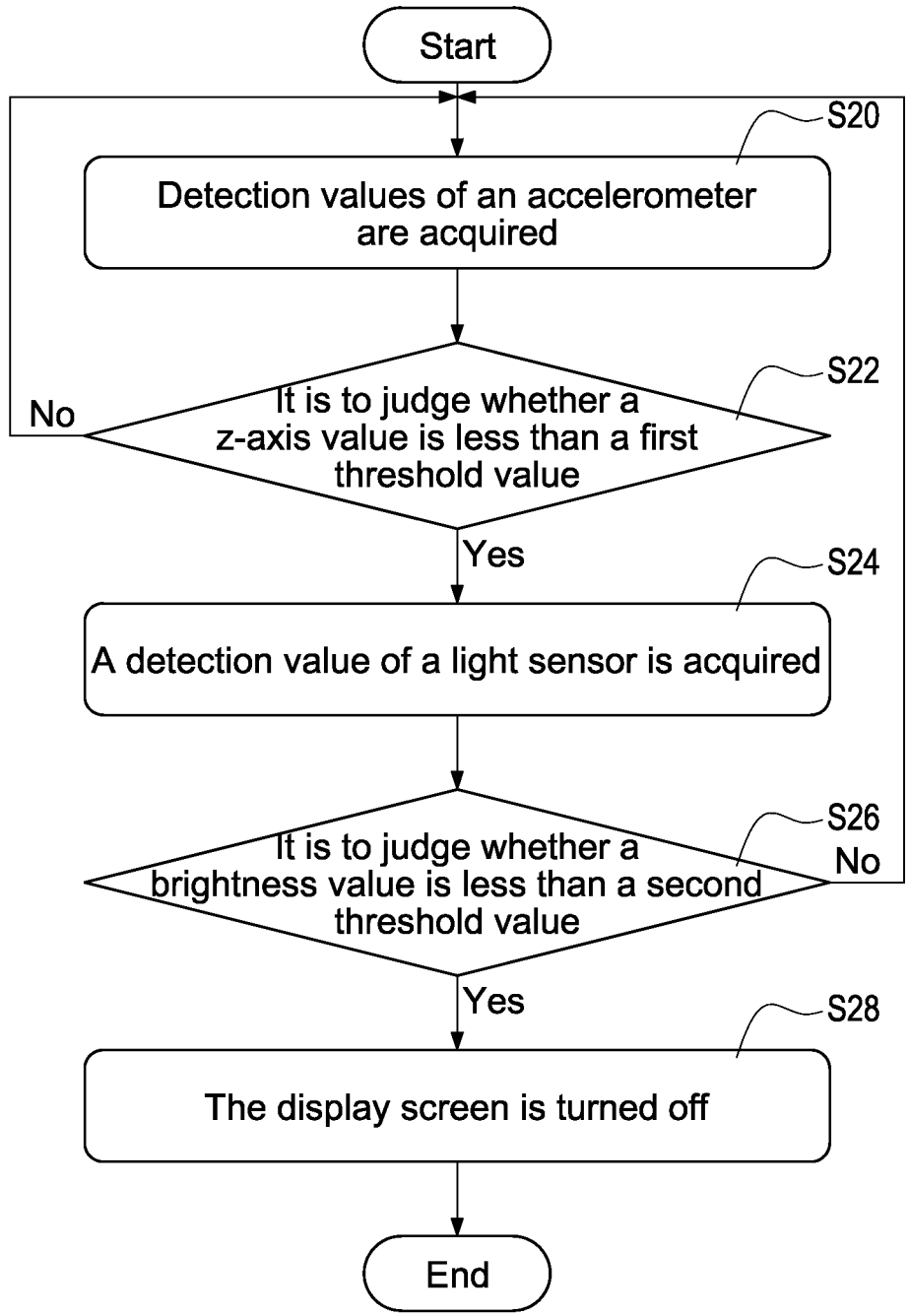
FIG. 2 is a flowchart of a screen off according to a first embodiment of the present disclosure.

Reference is made to FIG. 2 which is a flowchart of a screen off according to a first embodiment of the present disclosure. The steps of executing the flip on/off functions of the electronic apparatus 1 are illustrated in FIG. 2. First, an accelerometer installed in the electronic apparatus 1 is used to continuously detect to acquire detection values (S20) when the electronic apparatus is turned on and the display screen thereof is turned on. In this embodiment, the detection values of the accelerometer are an x-axis value, a y-axis value, and a z-axis value relatively to a horizontal plane. Also, an acceleration value is calculated according to the x-axis value, the y-axis value, and the z-axis value, but not limited.

After the electronic apparatus 1 acquires the detection values of the accelerometer, it is to judge whether the z-axis value is less than a first threshold value (S22). In this embedment, the z-axis value is less than the first threshold value when the display screen of the electronic apparatus 1 is downwardly flipped.

If the z-axis value is not less than the first threshold value, it is to return to the step (S20), that is, the electronic apparatus 1 continuously detects the detection values of the accelerometer. If the z-axis value is less than the first threshold value, the electronic apparatus 1 further acquires a detection value of the light sensor (S24). In this embodiment, the detection value of the light sensor is a brightness value (lux in unit) of the electronic apparatus, but not limited.

More specifically, both the accelerometer and the light sensor can continuously provide detection operations after the electronic apparatus 1 is turned on. In other embodiments, the light sensor is only provide the detection operation to acquire the brightness value when the z-axis value is judged to be less than the first threshold value, thus reducing the consumed power of the electronic apparatus 1. However, the embodiments are only exemplified but are not intended to limit the scope of the present disclosure.

After the electronic apparatus 1 acquires the brightness value, it is to judge whether the brightness value is less than a second threshold value (S26). In the embodiment, it represents that the display screen is covered, such that the electronic apparatus 1 is downwardly flipped to make the display screen be covered on a table surface when the brightness value is less than the second threshold value.

It represents that the display screen is not covered when the brightness value is not less than the second threshold value. Therefore, the electronic apparatus 1 does not actively off the display screen and it is to return to the step (S20), that is, the electronic apparatus 1 continuously detects the detection values of the accelerometer. If the brightness value is less than the second threshold value, and also the z-axis value is less than the first threshold value, the electronic apparatus 1 turns off the display screen (S28), such as turning off the supplied power for the display screen.

Figure 3B:
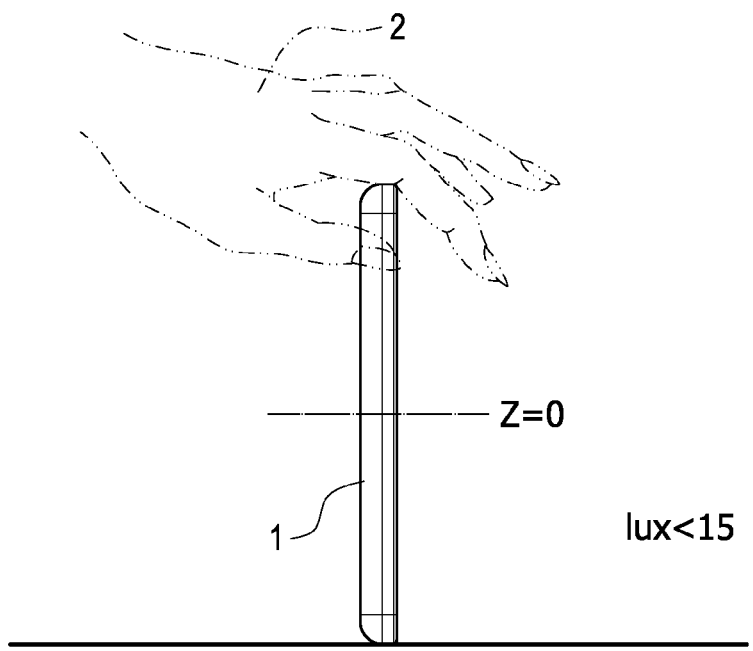
FIG. 3B is a schematic view of a second motion of operating the screen off according to the first embodiment of the present disclosure.
Figure 3C:
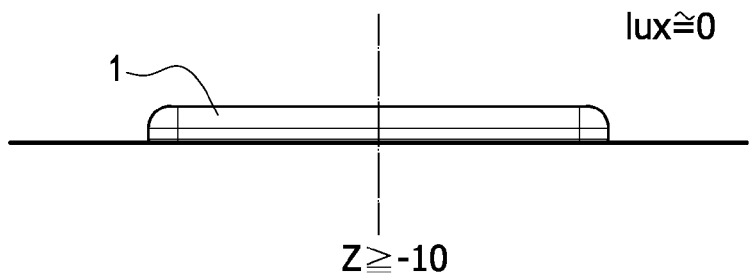
FIG. 3C is a schematic view of a third motion of operating the screen off according to the first embodiment of the present disclosure.

Reference is made to FIG. 3A, FIG. 3B, and FIG. 3C which are schematic views of a first, a second, and a third motion of operating the screen off according to the first embodiment of the present disclosure, respectively. In particular, the term "Z" represents the z-axis value and the term "lux" represents the brightness value. As shown in FIG. 3A, it is assumed that the electronic apparatus 1 is flat placed on the table and the display screen is upward, and an ambient light is around the electronic apparatus 1.

As shown in FIG. 3A, an angle between the electronic apparatus 1 and the horizontal plane is zero degree, and it is assumed that the z-axis value is less than or equal to 10 m/s$^2$ and the brightness value is maximum, such as is greater than or equal to 15 lux. In other words, the z-axis value is less than or equal to 10 m/s$^2$ and the brightness value is greater than or equal to 15 lux when the electronic apparatus 1 is placed on the table and the display screen is upward. However, the embodiments are only exemplified but are not intended to limit the scope of the present disclosure.

As shown in FIG. 3B, the z-axis value is zero m/s$^2$ and the brightness value is less than 15 lux when a user 2 flips the electronic apparatus 1 to make the electronic apparatus 1 vertical to the horizontal plane, namely, an angle between the electronic apparatus 1 and the horizontal plane is 90 degrees.

For example, it is assumed that the first threshold value is 2 and the second threshold value is 10. Under this condition, the electronic apparatus 1 judges that the z-axis value is less than the first threshold value and the brightness value is less than the second threshold value. Accordingly, the electronic apparatus 1 judges that the display screen is covered by the user 2 and automatically turns off the display screen.

For another example, it is assumed that the first threshold value is −5. Under this condition, the electronic apparatus 1 judges that the z-axis value is not less than the first threshold value so that the electronic apparatus 1 does not turn off the display screen.

As shown in FIG. 3C, the z-axis value is greater than or equal to −10 m/s$^2$ and the brightness value is equal to zero or is close to zero lux when the user 2 flips the electronic apparatus 1 to make the display screen be covered on the table surface, namely, the angle between the electronic apparatus 1 and the horizontal plane is 180 degrees.

In another preferred embodiment, it is assumed that the first threshold value is −5 and the second threshold value is 3. As shown in FIG. 3C, the electronic apparatus 1 judges that the z-axis value is less than the first threshold value and the brightness value is less than the second threshold value. Accordingly, the electronic apparatus 1 judges that the electronic apparatus 1 is flipped and the display screen is covered, and automatically turns off the display screen.

As mentioned above, if the user only flips the electronic apparatus 1 to make the display screen be downwardly and not be covered, the brightness value is greater than the second threshold value so that the electronic apparatus 1 does not turn off the display screen. Accordingly, the electronic apparatus 1 can be normally operated without being turned off when the user 2 lies in bed to operate the electronic apparatus 1 and the display screen is downward.

Figure 4:
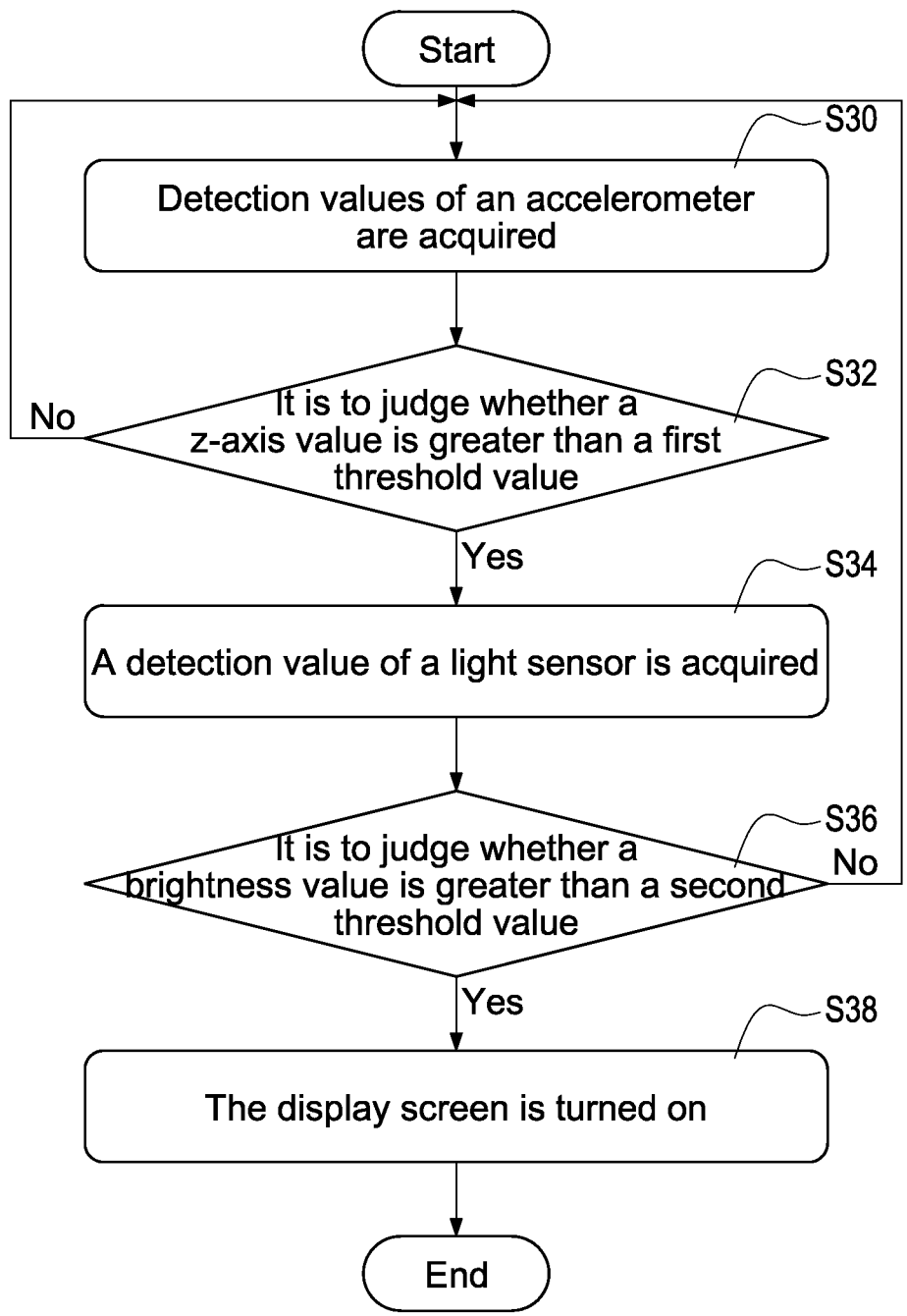
FIG. 4 is a flowchart of a screen on according to a first embodiment of the present disclosure.

As shown in FIG. 4 which is a flowchart of a screen on according to a first embodiment of the present disclosure. Comparing to FIG. 2 which is a flowchart of a screen off, FIG. 4 illustrates the screen on. In particular, the electronic apparatus 1 executes the flip on/off function.

More specifically, the electronic apparatus 1 continuously detects to acquire the detection values of the accelerometer when the display screen thereof is turned off (S30). Afterward, it is to judge whether the z-axis value of the electronic apparatus 1 is greater than the first threshold value (S32). In this embodiment, it represents that the display screen of the electronic apparatus 1 is upwardly flipped when the z-axis value is changed from less than the first threshold value to greater than the first threshold value.

If the z-axis value is not greater than the first threshold value, it is to return to the step (S30), that is, the electronic apparatus 1 continuously detects the detection values of the accelerometer. If the z-axis value is greater than the first threshold value, the electronic apparatus 1 further acquires a detection value of the light sensor (S34). In this embodiment, both the accelerometer and the light sensor can be operated simultaneously, or the light sensor is operated after the z-axis value is detected to greater than the first threshold value. However, the embodiments are only exemplified but are not intended to limit the scope of the present disclosure.

After the electronic apparatus 1 acquires the detection value of the light sensor, it is to judge whether the brightness value is greater than the second threshold value (S36). In this embodiment, it represents that the display screen of the electronic apparatus 1 is not covered when the brightness value is changed from less than the second threshold value to greater than the second threshold value.

If the brightness value is not greater than the second threshold value, it is to return to the step (S30), that is, the electronic apparatus 1 continuously detects the detection values of the accelerometer. Under this condition, it represents that the display screen is covered and the display screen is not turned on by the electronic apparatus 1. If the brightness value is greater than the second threshold value, and also the z-axis value is greater than the first threshold value, the electronic apparatus 1 turns on the display screen (S38), such that the display screen is re-powered on.

Figure 5:
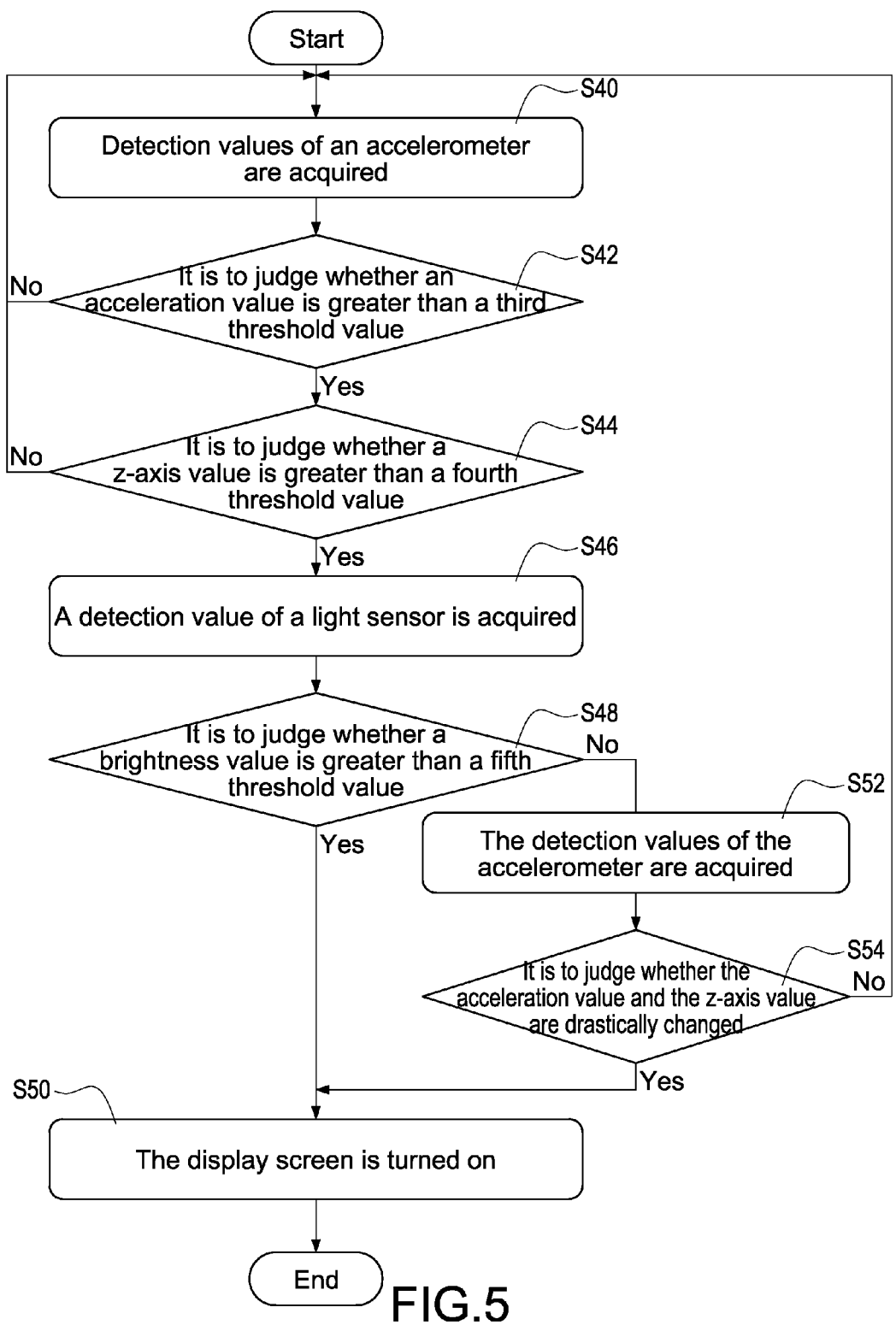
FIG. 5 is a flowchart of a screen on according to a second embodiment of the present disclosure.

Reference is made to FIG. 5 which is a flowchart of a screen on according to a second embodiment of the present disclosure. In particular, the flowchart illustrates that the electronic apparatus 1 enables the awake-in-motion function. First, the accelerometer installed in the electronic apparatus 1 is used to continuously detect to acquire detection values (S40) when the electronic apparatus is turned on and the display screen thereof is turned off. In this embodiment, the detection values of the accelerometer are an x-axis value, a y-axis value, and a z-axis value relatively to a horizontal plane. Also, an acceleration value is calculated according to the x-axis value, the y-axis value, and the z-axis value.

In this embodiment, it is to judge whether the acceleration value is greater than a third threshold value (S42) after the electronic apparatus 1 acquires the detection values of the accelerometer (S40). In this embedment, the acceleration value is greater than the third threshold value when the electronic apparatus 1 is picked up.

If the acceleration value is not greater than the third threshold value, it is to return to the step (S40), that is, the electronic apparatus 1 continuously detects the detection values of the accelerometer. If the acceleration value is greater than the third threshold value, the electronic apparatus 1 further judges whether the z-axis value is greater than a fourth threshold value (S44). In this embodiment, it represents that the electronic apparatus 1 is picked up and in an active operation by the user 2 when the z-axis value is greater than the fourth threshold value. As shown in FIG. 6B, an angle between the electronic apparatus 1 and the horizontal plane is between 0 to 90 degrees, also the preferred angle is between 30 to 60 degrees.

The step (S44) is executed to overcome the misjudgement problem of the electronic apparatus 1. More specifically, the acceleration value may be greater than the third threshold value due to a malfunction of the shaken electronic apparatus 1 if the electronic apparatus 1 is placed in a pocket or a backpack of the user 2 and the user 2 moves.

If the z-axis value is not greater than the fourth threshold value, it is to return to the step (S40), that is, the electronic apparatus 1 continuously detects the detection values of the accelerometer. If the z-axis value is greater than the fourth threshold value, it represents that the electronic apparatus 1 is in the active operation by the user 2. Therefore, the light sensor installed in the electronic apparatus 1 is used to continuously detect to acquire detection value of the light sensor (S46). Similarly, both the accelerometer and the light sensor can be operated simultaneously, or the light sensor is operated after the acceleration value is greater than the third threshold value and/or the z-axis value is greater than the fourth threshold value. However, the embodiments are only exemplified but are not intended to limit the scope of the present disclosure.

After the electronic apparatus 1 acquires the detection value of the light sensor, it is to judge whether the brightness value is greater than a fifth threshold value (S48). In this embodiment, it represents that the electronic apparatus 1 is used under an environment with ambient light when the brightness value of the electronic apparatus 1 is greater than the fifth threshold value. If the brightness value is greater than the fifth threshold value, the electronic apparatus 1 turns on the display screen (S50).

There are two following possibilities occur if the brightness value is not greater than the fifth threshold value:

1. The electronic apparatus 1 is placed in an environment without ambient light, such as a pocket or a backpack of the user so that the acceleration value is greater than the third threshold value and the z-axis value is greater than the fourth threshold value due to a malfunction of the shaken electronic apparatus 1.

2. The electronic apparatus 1 is used by the user 2 under an environment without ambient light, such as a darkroom.

In order to distinguish the two possibilities, the electronic apparatus 1 acquires the detection values of the accelerometer again after the brightness value is not greater than the fifth threshold value. Accordingly, the display screen of the electronic apparatus 1 can be turned on when the electronic apparatus 1 is operated under the environment without ambient light by instantly shaking the electronic apparatus 1.

More specifically, the electronic apparatus 1 further acquires the detection values of the accelerometer if the brightness value is not greater than the fifth threshold value (S52). Afterward, it is to judge whether the acceleration value and the z-axis value are drastically changed (S54). In particular, the drastic changes in the acceleration value and the z-axis value are exemplified as follows: the acceleration value is instantly changed from 1 to 10 m/s$^2$ and the z-axis value is instantly changed from 10 to 1.

It represents that the electronic apparatus 1 is instantly shaken by the user 2 if both the acceleration value and the z-axis value of the electronic apparatus 1 are drastically changed so that the step (S50) is executed to turn on the display screen. On the contrary, it represents that the electronic apparatus 1 is not normally operated by the user 2 when neither the acceleration value nor the z-axis value of the electronic apparatus 1 is drastically changed. Accordingly, it is return to the step (S40), that is, the electronic apparatus 1 continuously detects the detection values of the accelerometer.

Figure 6A:
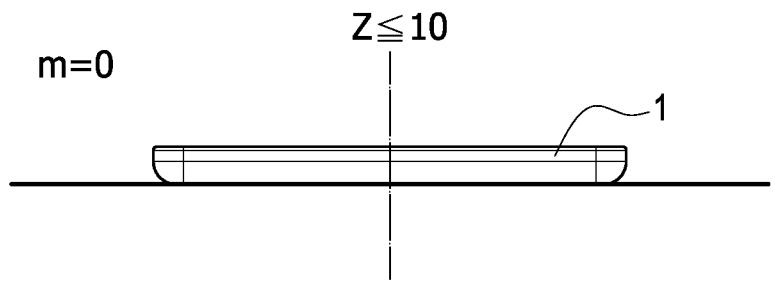
FIG. 6A is a schematic view of a first motion of operating the screen on according to the second embodiment of the present disclosure.
Figure 6B:
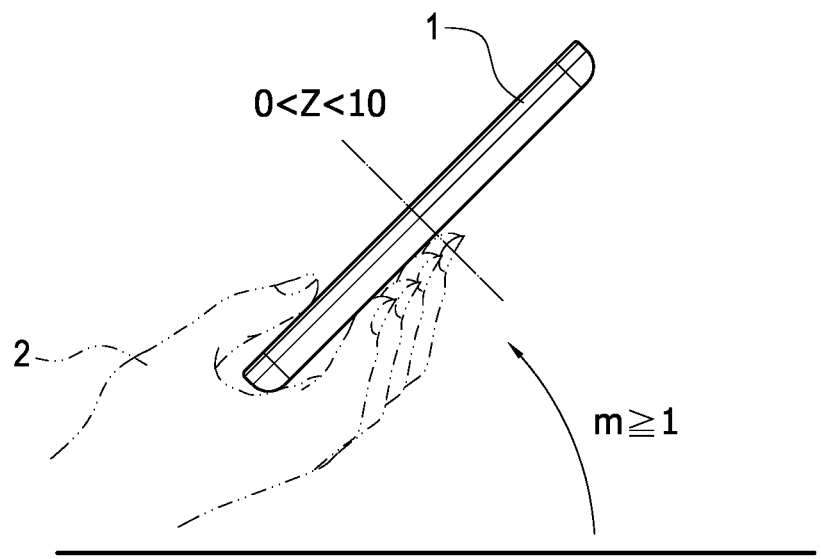
FIG. 6B is a schematic view of a second motion of operating the screen on according to the second embodiment of the present disclosure.
Figure 6C:
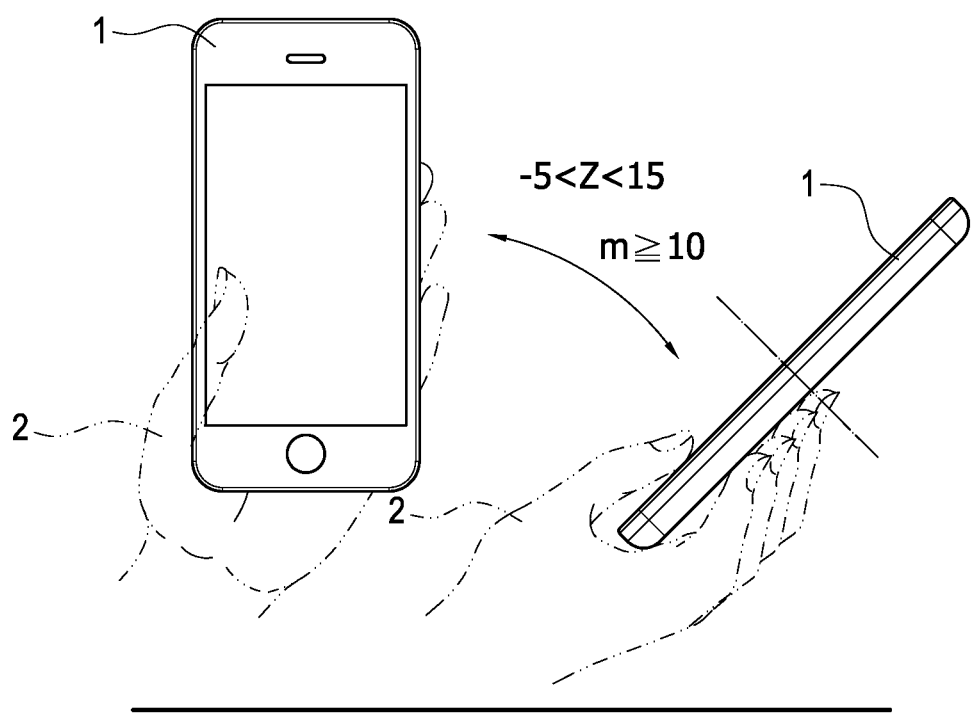
FIG. 6C is a schematic view of a third motion of operating the screen on according to the second embodiment of the present disclosure.

Reference is made to FIG. 6A, FIG. 6B, and FIG. 6C which are schematic views of a first, a second, and a third motion of operating the screen on according to the second embodiment of the present disclosure, respectively. In particular, the term "Z" represents the z-axis value and the term "m" represents the acceleration value. As shown in FIG. 6A, the angle between the electronic apparatus 1 and the horizontal plane is zero degree, the acceleration value is zero m/s$^2$, and the z-axis value is less than or equal to 10 m/s$^2$ when the electronic apparatus 1 is flat placed on the table.

As shown in FIG. 6B, it represents that the electronic apparatus 1 is picked up and in an active operation by the user 2 when the acceleration value is greater than or equal to 1 m/s$^2$ and the z-axis value is changed between zero and 10 m/s$^2$. In particular, the angle between the electronic apparatus is between zero to 90 degrees; the preferred angle is between 30 to 60 degrees, and the best angle is 45 degrees.

In this embodiment, it is assumed that the third threshold value is 1 and the fourth threshold value is 1. Under this condition, the electronic apparatus 1 judges that the acceleration value is greater than the third threshold value and the z-axis value is greater than the fourth threshold value. Accordingly, it represents that the electronic apparatus 1 is in the active operation by the user 2.

If the light sensor of the electronic apparatus 1 can acquire ambient light, and also a brightness value of the acquired ambient light is greater than the fifth threshold value, the electronic apparatus 1 directly turns on the display screen. On the contrary, the user 2 has to swing or shake hard the electronic apparatus 1 to make the electronic apparatus 1 confirm that the electronic apparatus 1 is normally operated if the light sensor of the electronic apparatus 1 cannot acquire any ambient light.

As shown in FIG. 6C, it represents that the user 2 swings or shakes hard the electronic apparatus 1 when the acceleration value is greater than the third threshold value, the z-axis value is greater than the fourth threshold value, but the brightness value is not greater than the fifth threshold value (or the brightness value is equal to zero). For example, the acceleration value is greater than 10 m/s$^2$ and the z-axis value is widely changed between −5 to 15. Accordingly, the electronic apparatus 1 automatically turns on the display screen because the electronic apparatus 1 judges that the acceleration value and the z-axis value are drastically changed.

By the method of the present disclosure, the user 2 can flip the electronic apparatus 1 to automatically turn on or turn off the display screen by the electronic apparatus 1. Further, the electronic apparatus 1 is picked up by the users and automatically turns on the display screen thereof under the environment with and without ambient light. Furthermore, the detection values are judged to overcome the misjudgement problem of the electronic apparatus 1. In addition, the application program installed in the electronic apparatus 1 records executable program codes of the electronic apparatus 1. When the electronic apparatus 1 executes the application program, the steps shown in FIG. 2, FIG. 4, and FIG. 5 can be implemented to turn on/off the display screen while flipping the electronic apparatus 1 and turn on the display screen while picking up the electronic apparatus 1.

Although the present invention has been described with reference to the preferred embodiment thereof, it will be understood that the present invention is not limited to the details thereof. Various substitutions and modifications have been suggested in the foregoing description, and others will occur to those of ordinary skill in the art. Therefore, all such substitutions and modifications are intended to be embraced within the scope of the present invention as defined in the appended claims.

What is claimed is:

1. A method of controlling a display screen of an electronic apparatus, and the electronic apparatus having an accelerometer and a light sensor; the method comprising steps of:
   (a) acquiring a z-axis value of the electronic apparatus through the accelerometer;
   (b) acquiring a brightness value of the electronic apparatus through the light sensor when the z-axis value is less than a first threshold value; if the z-axis value is not less than the first threshold value, it is to return to the step (a) to reacquire the z-axis value; and
   (c) turning off the display screen when the brightness value is less than a second threshold value; if the brightness value is not less than the second threshold value, it is to return to the step (a) to reacquire the z-axis value.

2. The method of controlling the display screen of the electronic apparatus in claim 1, wherein the z-axis value is compared to the first threshold value when the display screen is downwardly flipped.

3. The method of controlling the display screen of the electronic apparatus in claim 2, wherein the brightness value is compared to the second threshold value when the display screen is covered.

4. The method of controlling the display screen of the electronic apparatus in claim 1, further comprising steps of:
   (d) acquiring the z-axis value through the accelerometer after the display screen is turned off;
   (e) acquiring the brightness value through the light sensor when the z-axis value is larger than the first threshold value after step (d); and
   (f) turning on the display screen when the brightness value is larger than the second threshold value after step (e).

5. The method of controlling the display screen of the electronic apparatus in claim 4, wherein the z-axis value is compared to the first threshold value when the display screen is upwardly flipped.

6. A method of controlling a display screen of an electronic apparatus, and the electronic apparatus having an accelerometer and a light sensor; the method comprising steps of:

(a) acquiring detection values of the accelerometer; wherein the detection values comprises at least a z-axis value and an acceleration value;
(b) judging whether the acceleration value is larger than a third threshold value;
(c) judging whether the z-axis value is larger than a fourth threshold value when the acceleration value is larger than the third threshold value;
(d) acquiring a brightness value of the electronic apparatus through the light sensor when the z-axis value is larger than the fourth threshold value; and
(e) turning on the display screen of the electronic apparatus when the brightness value is larger than a fifth threshold value.

7. The method of controlling the display screen of the electronic apparatus in claim 6, wherein the acceleration value is compared to the third threshold value when the electronic apparatus is picked up.

8. The method of controlling the display screen of the electronic apparatus in claim 7, wherein the electronic apparatus is configured to judge whether the z-axis value is greater than the fourth threshold value when the electronic apparatus is in an active operation.

9. The method of controlling the display screen of the electronic apparatus in claim 6, further comprising steps of:
(f) acquiring the detection values of the accelerometer again when the brightness value is less than the fifth threshold value;
(g) judging whether the acceleration value and the z-axis value are drastically changed; and
(h) turning the display screen when the acceleration value and the z-axis value are drastically changed.

10. An application program stored inside an electronic apparatus, and the application program configured to record executable program codes of the electronic apparatus; the steps in claim 1 are executed when the application program is loaded and executed in the electronic apparatus.

* * * * *